United States Patent [19]

Robinson

[11] 4,186,388
[45] Jan. 29, 1980

[54] PROXIMITY DETECTOR

[76] Inventor: Donald W. Robinson, 3011 W. 130th Ave., Crown Point, Ind. 46307

[21] Appl. No.: 852,830

[22] Filed: Nov. 18, 1977

[51] Int. Cl.$^2$ .......................... A63K 1/00; G01T 1/16; G08B 23/00
[52] U.S. Cl. .................................... 340/556; 250/221; 340/539; 340/323 R
[58] Field of Search .................... 340/309.1, 323, 555, 340/556, 557, 539; 356/3, 18; 272/4, 5, 100, 103, DIG. 5; 250/221

[56] References Cited

U.S. PATENT DOCUMENTS

| | | | |
|---|---|---|---|
| 2,547,332 | 4/1951 | Loveless et al. | 250/221 X |
| 3,370,285 | 2/1968 | Cruse et al. | 340/556 |
| 3,471,234 | 10/1969 | Studebaker | 356/3 |
| 3,596,103 | 7/1971 | Matthews et al. | 250/221 |
| 3,752,978 | 8/1973 | Kahl, Jr. et al. | 250/340 |
| 3,810,148 | 5/1974 | Karsten et al. | 340/323 |
| 3,914,753 | 10/1975 | Cho | 340/556 X |
| 3,932,746 | 1/1976 | Swanson | 250/221 |

*Primary Examiner*—John W. Caldwell, Sr.
*Assistant Examiner*—Joseph E. Nowicki
*Attorney, Agent, or Firm*—Robert D. Farkas

[57] ABSTRACT

A proximity detector preferably utilizes a photoelectric cell, responsive to light beams emanating from a lamp carried by a tripod supported light projecting apparatus. Such apparatus includes a height adjustment utilizing a telescoping pair of tubes, one of which is supported by three tripod legs, each of which is adjustable in height. The lowermost regions of the tripod legs carry lockable wheels. The tubes are calibrated together with one another and indicate the total height of the light source utilizing a calibrated scale. The housing carrying the light source may be tiltable and locked into such position by a set screw arrangement. A filter may be utilized so as to provide polarized light beams or colored light beams, as desired. Another housing, equivalent to the housing utilized to carry the light source, encloses a photoelectric cell and a timer. When the light beam is interrupted feeding the photoelectric cell, the timer stops to operate and simultaneously an audible and visual alarm is sounded. A power supply is utilized having rechargeable batteries converted for recharging utilizing household utility voltage therefor.

9 Claims, 2 Drawing Figures

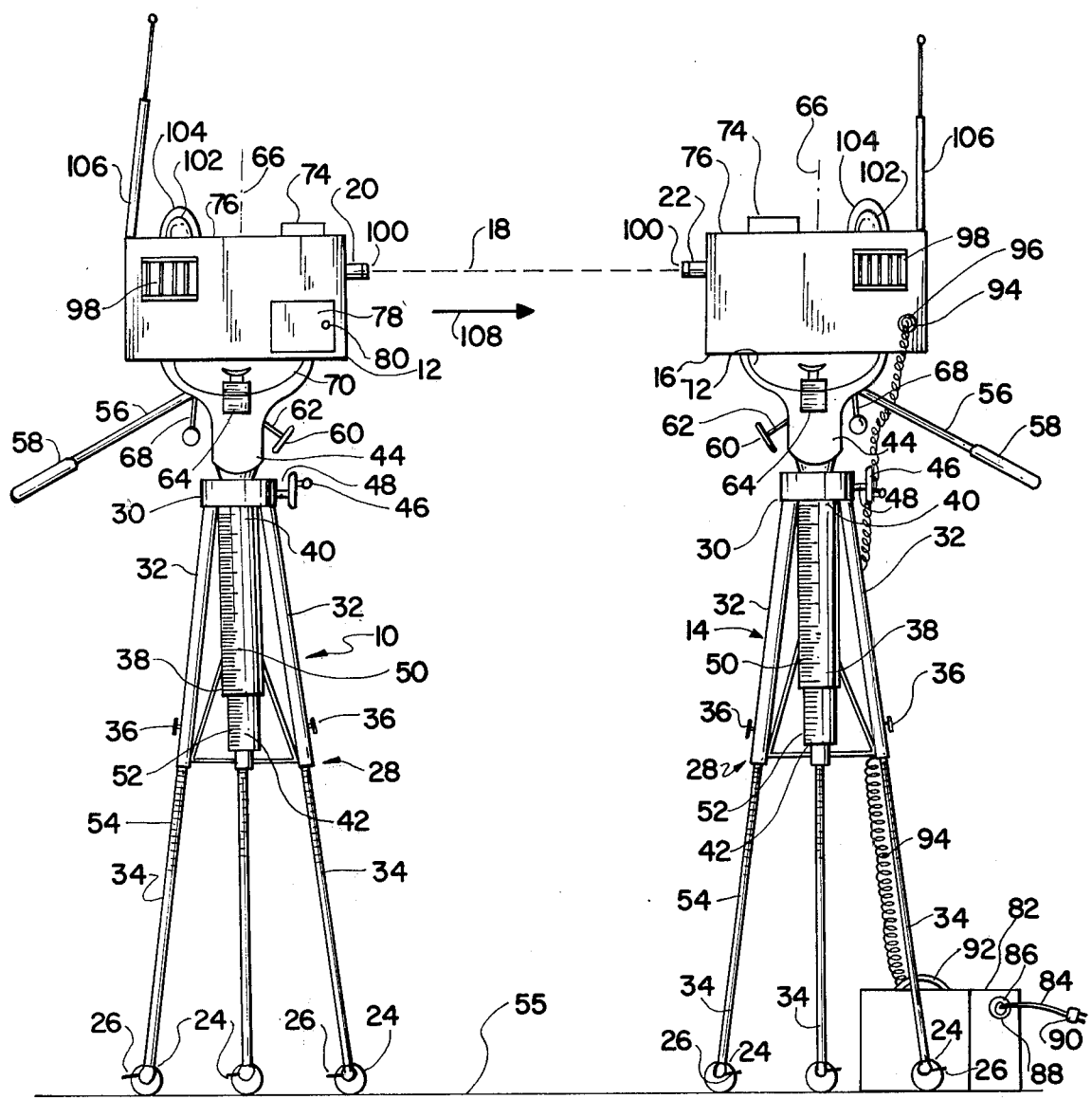
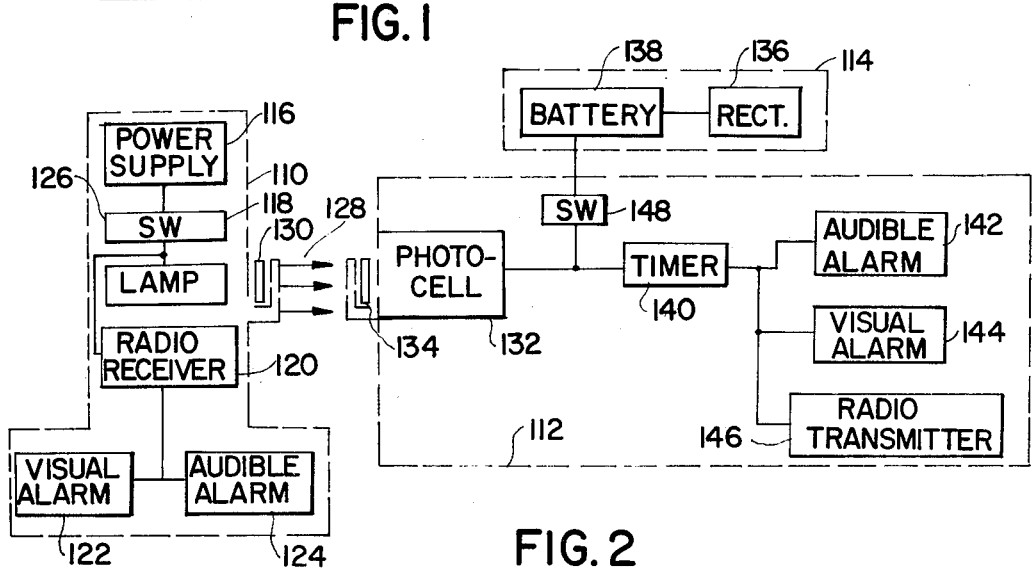
FIG. 1
FIG. 2

PROXIMITY DETECTOR

BACKGROUND OF THE INVENTION

1. The Field of the Invention

This invention relates to light beam detectors and more particularly to that class of apparatus whose mounting needs facilitate locating such devices on any selected height relative to a supporting surface.

2. Description of the Prior Art

The prior art abounds with photoelectric devices utilized for a variety of functions. U.S. Pat. No. 2,626,662 issued on Jan. 27, 1953 to J. E. Coogan teaches an alarm control for clocks and photoelectric switches having an exciter lamp and transmitting lens projecting outwardly from an enclosure to a receiving lens into a photoelectric cell. Audible alarm means are provided within the enclosure operable when the beam is broken as it transits between lenses. An electric alarm clock is housed within the apparatus such that once the alarm is turned to an on condition a solenoid operated rod is caused to close a door in the housing so that tampering with the housing to shut off the alarm clock is prohibited. Any attempt to open the enclosure without breaking the beam, usually placed over the foot of the bed, results in the alarm apparatus being operated thereby forcing the user to get out of bed at the appointed time without simply resetting the alarm and falling off to sleep again.

The U.S. Pat. No. 2,547,332 issued on Apr. 3, 1951 to B. B. Loveless et al describes a race starting apparatus utilizing different audible signals so as to prepare and start the contestants off at the beginning of a race. Included within the apparatus is a photoelectric device which signals that one or more of the athletes participating in the race had crossed the starting line before the transmission of the final starting signal. Such apparatus comprises a light source and a receiver within a housing utilizing a light beam focused into and out of the housing employing individual lenses. A reflecting device is provided in another housing disposed opposite and transverse to the track at the point of which the race is to be started.

U.S. Pat. No. 3,810,148 issued May 7, 1974 to F. W. Karsten et al describes an indicator for detecting and indicating the intrusion or presence of objects on a line or boundary being monitored by officials or monitoring personnel, such as a boundary line at a sporting event or contest. Mr. Karsten's teaching describes a plurality of trained pulse beams of light emanating outwardly from a light transmitting apparatus which in turn is received by a photoelectric cell such that the light beam is interrupted at a periodic controlled rate. Any further interruption, out of phase with the periodicity of interruptions generated by the apparatus comprises a breaking of the beam and hence the crossing of the boundary line which the apparatus monitors.

The aforementioned teachings all suffer the common dificiency of either having an apparatus which is expensive to fabricate or difficult to install, or both. In any event, all of these devices are hard to move from place to place so as to be adjustable easily in installation for a variety of sporting events, including those which require substantial height adjustments.

SUMMARY OF THE INVENTION

A primary object of the present invention is to provide a line monitoring apparatus which may be easily adjusted as to location, height and angle of use, providing thereby flexibility in the use thereof.

Another object of the present invention is to provide an apparatus which is inexpensive to fabricate and reliable in use.

Still another object of the present invention is to provide a boundary interruption detection apparatus which is portable in nature and may be moved from place to place with a relative ease.

Yet another object of the present invention is to provide a portable apparatus which is useful operating from household utility voltage as well as from a rechargeable battery power supply.

A further object of the present invention is to provide an apparatus which can be used that the beam transmitting device is signaled by the beam receiving device so that the transmitting portion of the present invention provides an alarm signaling that the boundary line has been interrupted.

Another object of the present invention is to provide a boundary line monitoring system, which may be utilized with a duplicate system, both providing a radio signal emanating outwardly thereform such that a timing apparatus can be remotely located from the installation site of both systems, thereby measuring the elapsed time between crossing two displaced boundary lines.

Still another object of the present invention is to provide an apparatus which can be economically utilized, though rugged in use, for sporting events wherein adjustment of height is critical.

Yet another object of the present invention is to provide an apparatus whose visual and audible alarm systems are energized for a predetermined period of time when the monitored boundary line is crossed instantaneously.

Heretofore, boundary line crossing detection systems have been provided representing apparatuses that are difficult to install, expensive to fabricate, and generally unsuitable for a wide variety of athletic sports. The present invention, though inexpensive in construction, provides a flexible way of monitoring the crossing of a boundary line such as training in the track and field area of athletes to monitor the height level of clearance over low or high hurdles. This is highly desirable since if the athlete clears the hurdle at excessive height, extra time is consumed and the race is run far to slowly. Another use is in practice in training long jumpers so that the elevation that the long jumper clears is monitored. This eliminates the need for hurdles, lessening the chance of injury. High jump practice similarly can be accomplished without setting up a bar and resetting it after each time the bar is knocked to the ground. Pole vaulting, difficult for beginners to learn, can be practiced without a bar, therefore lessening the danger and eliminating the need to reset the bar. Since many pole vaulters are frightened of the bar, their attitude towards practice is made positive thereby. The apparatus can also be employed as a counting device. For example, laps can be counted in a long distance race or in practice sessions. Timing may be measured by utilizing a pair of sets of devices, each of which transmits, upon the passing of the boundary line, a radio frequency signal. A slave operated stop watch mechanism, or timer, may be activated by the first transmitted frequency signal, and thence deactivated by the second signal. Another use of the present invention is to obtain time at a finish line. This device will audibly signal the first man breaking the tape. The apparatus also may be employed as a distance indicator such as signaling a runner that he is a given distance from the finish line so that a sprinting effort may be made thereafter.

The present invention basically uses a tripod device which may be adjusted by having each leg extended so as to have the lower ends rest on the ground so as to prevent further lateral motion. This enables the apparatus to be utilized on a practice field, such as those employed by schools and universities. Official monitoring, taking place at a remote location, may utilize the radio signals emanating outwardly from the transmitter portion of the apparatus.

These objects as well as other objects of the present invention, will become more readily apparent after reading the following description of the accompanying drawings.

BRIEF DESCRIPTION OF THE DRAWINGS

FIG. 1 is a side elevation view of the devices of the present invention.

FIG. 2 is a block diagram of the electrical and optical devices of the present invention.

DESCRIPTION OF THE PREFERRED EMBODIMENT

The structure and method of fabrication of the present invention is applicable to two portable tripod supported units. Each unit may be operated from an internal battery power supply, or, if desired, a household utility operated rectifier assembly providing direct current to a rechargeable battery system. Such external apparatus is contained in a portable carrying case, having thereon a handle for ease of carrying the device. A flexible coil cable interconnects the external power supply to a housing affixed to the top of the tripod. Each tripod is provided having three legs, each including an inner tube and an outer tube telescopingly engaged to one another and a hand operated knob which may lock the tubes together at a desired height. The lowermost region of the lowermost tube is secured to a wheel, permitting the tripod to be wheeled from location to location. Such wheel is provided with a locking apparatus, well known in the art that prevents the wheel from further rotation when disposed in a locking condition. The uppermost end of the tripod is provided with a platform, to which the uppermost ends of the uppermost tubes are permanently secured. A large tube extends downwardly and centrally from the platform in the region intermediate the legs surrounding it. Such tube is marked with indicia calibrated in distance. A crank handle is secured to a shaft having the other end of the shaft geared to rack-like teeth in the large tube such that the large tube may be operated in an upward and downward direction by rotation of the crank handle. At least one leg assembly, comprising the two tubes, is similarly marked with indicia so as to permit a user to determine the overall height of the platform relative to the surface of the ground supporting the tripod. Above the tripod, a housing mount is secured. The housing mount is provided with a handle extending angularly downwardly outwardly therefrom. The free end of the handle is provided with a rubber-like grip. A bar, secured extending outwardly from the housing mount, may be operated so as to lock the housing mount against tilting relative to the plane of the earth supporting the tripod. The housing mounting is also free to swivel, and may be locked into a nonswivelable desired location by the operation of a knob-operated set screw. Thus, the housing may be turned 360 degrees about an axis extending longitudinally with the longitudinal axis of the large tube, as well as being able to be tilted upwardly and downwardly relative to such longitudinal axis dependent upon the position in which the housing is set after loosening the set screw devices. The embodiment of the housing utilizing internally operating batteries is provided with an access panel for simple and convenient replacement thereof. A light emitting dome, preferably fabricated from a transparent material, is located on the uppermost surface of the housing and contains a lamp therein. The lamp may be of the incandescent variety or, if desired, of the photoflash type. Another opening in the housing is covered with a grille-like covering behind which, and within the housing, a audible alarm apparatus is located. The audible alarm apparatus may be a buzzer, horn, or electronic siren. One end of the housing is provided with a lens assembly so that light beams entering or leaving the lens assembly can be focused into a sharp beam whose tendency to diverge is minimized. A radio antenna, preferably of the telescoping variety, is disposed secured to an uppermost lateral surface of the housing and extends upwardly therefrom.

The embodiment of the apparatus utilizing the external power pack is provided with a receptacle through which the power from the flexible electrical cable passes. A plug and receptacle may be employed at this location. The lens opening located outwardly from the housing is provided having a filter adapter fitting thereon. Such filter adapter may be employed to fasten the fractionating filters, "black-light" filters or the like. This facilitates cutting down on receiving unwanted light signals in the receiver apparatus which tends to interfere with the accuracy of responding only to breaking the light beam. Still another embodiment of the present invention utilizes the indicia displayed on the external surface of the large tube and on the leg assembly supporting the tripod being calibrated so as to reflect the center of the lens apparatus relative to the ground supporting the tripod. A bubble operated leveling device is provided on the surface of the housing so as to enable a user to guarantee that the received or transmitted light beam is operating in a horizontal plane only. Such device is particularly helpful in operating the apparatus so as to measure a predetermined height along a line extending the distance in which both housings are separated.

Now refer to the figures, and more particularly to the embodiment illustrated in FIG. 1 showing tripod 10 carrying housing 12 thereon. Tripod 14 is shown separated from tripod 10 and carries housing 16 in the uppermost regions thereof. Dotted lines 18 represent a light beam transiting between lens assemblies 20 and 22, connected to housings 12 and 16 respectively. Wheels 24 are shown at the lowermost ends of the tripods and are provided with locking mechanisms 26 of the type well known in the art. Legs 28 provide support for platforms 30 attached to the uppermost tubes 32. Tubes 34 are shown extending downwardly from tubes 32, being locked in a telescoping preferred position utilizing locking knobs 36 therefor, in a fashion well known to the art. Large tube 38 has the uppermost regions 40 thereof extend through an opening in platform 30, not shown. Smaller tube 42 is shown extending downwardly from platform 30 having the uppermost end thereof secured rigidly to housing support apparatus 44.

Handle 46 utilizes shaft 48, coupled to a spur gear, not shown, attached to an externally toothed portion of smaller tube 42, not shown, such that rotating handle 46 causes smaller tube to slide along the length of larger tube 38. Indicia 50 is shown carried on the external surface of large tube 38 as is indicia 52, carried on the external surface of small tube 42. Indicia 54 is provided on the external surface of lowermost leg members 34. Thus, the leg assembly may be modified in height and the housing support member elevated above the tripod platform 30, at the will of the user, so as to place housings 12 and 16 at any desired height relative to supporting surface 55. Handle bar 56 is shown projecting outwardly on a portion of housing support 44, having rubber-like grip 58 secured to end thereof. Knob 60 is secured at one end of rod 62, such that the other end of the rod is provided having external threads thereon or engaging an opening in housing support 44 and circular projection 64 extending downwardly into a portion of housing support 44. Housings 12 and 16 may be rotated about axis lines 66 when rod 62 is loosened. When knob 60 is tightened, protrusion 64 is prevented from rotating thus limiting the angle of rotation of housings 12 and 16. Locking bars 68 serve to secure curved portions 70 from angular movement relative to a horizontal line extending transverse to vertical lines 66. Thus, an optical path of lenses 20 and 22, may be set at any desired angle relative to supporting surface 55. Bubble-like leveling devices 74, of conventional design, are shown secured to an uppermost lateral surface 76 of housings 12 and 16, serving to maintain such housings in a horizontal position when desired. Access panel 78 utilizes set screw 80 to retain the panel onto a surface of housing 12. A compartment, not shown, there behind contains a battery power supply for the electrical apparatus housed within housing 12. Housing 121, as shown, is the embodiment of the present invention operating solely by battery power. If desired, the battery, not shown, contained within housing 12 may be of the rechargeable variety such that an external source of power may charge the battery. Housing 16, as shown, utilizes power supply 82 having electrical cable 84 secured thereto. Cable 84 may be removeable if desired by having socket 86 insert into receptacle 88. Plug 90 is shown at one end of the cable. Handle 92 facilitates carrying power supply 82. Coiled flexible cable 94 provides electrical energy, contained within power supply 82, to housing 12, utilizing plug 94 inserted into receptacle 96, carried by housing 16. Grills 98 are shown carried by the housing and are utilized so as to permit audible tones, generated within housings 12 and 16, to be easily heard from a location outwardly therefrom. Lens assemblies 20 and 22 include filter elements 100 located in the outermost portions thereof. Such filter elements may be removeable and be of a variety of types, including various colors, gratings, as well as transmitting only ultraviolet light signals. External lamps 102 are visible through lamp covers 104, fabricated from a transparent material. Antennas 106 are shown carried by the uppermost lateral surface 76 of housings 12 and 16. Housing 12 may be utilized solely to transmit light in the direction of arrow 108 towards housing 16. Conversely, housing 16 can be utilized to transmit light towards housing 12 in a direction opposite arrow 108, if desired. Housing 12 may be provided with power supply 82 and flexible cord 94. Alternately, housing 16 may be provided without power supply 82 and flexible cable 94, utilizing batteries, not shown, within housing 16 as the sole source of energy.

FIG. 2 illustrates dotted lines 110 depicting the electronic components that may be housed in either housing 12 or 16, shown in FIG. 1. Such apparatus is primarily used to transmit light beams to a campanion apparatus, shown contained within dotted lines 112. Dotted line 114 outlines the electrical components comprising power supply 82, shown in FIG. 1. Power supply 116 is a battery complement arranged so as to provide suitable electrical energy for the operation of the lamp 118 and radio receiver 120, as well as visual alarm 122 and audible 124. The audible alarm may be an electrically operated horn, siren or other electronically activated audible tone producing device. The visual alarm, depicted by numerals 122, may be in the form of an incandescent lamp bulb, depicted by numerals 102, as shown in FIG. 1. When switch 126 is closed, lamp 118 is energized, simultaneously with radio receiver 120. Light beams 128 leave lamp 118 after passing through, in part, filter 130 shown removeably secured and adjacent to lamp 118. When radio receiver 120 receives a signal of a given frequency and intensity and duration, visible alarm 122 and audible alarm 124 is activated for the same time period. Photoelectric cell 132 is covered in part by filter 134, acting on light beams 128 before they engage the active portions of photocell 132. Rectifier 136 is conventional in design and preferably includes a line voltage operated step down transformer and a bridge rectifier circuit connected to the secondary thereof. Battery 138, preferably of the rechargeable variety, provides operating power for timer 140 and audible alarm 142 and visual alarm 144, as well as radio transmitter 146, when switch 148 is closed. When photocell 132 has light beams 128 disengaged therefrom, such as by having the light beams intercepted by part of a body of an athlete, photocell 132 signals timer 142 to commence a timing cycle. Simultaneously therewith, audible alarm 142 and visual alarm 144 and radio transmitter 146 are each energized. When timer 140 runs out, audible alarm 142 ceases to sound and visual alarm 144 ceases to emit light beams. Radio transmitter 146 will then turn off its radiated power, such that radio receiver 120 will fail to receive such signals cutting off the operation of visual alarm 122 and audible alarm 124. Thus, visual alarms 122 and 144 and audible alarms 124 and 146 will operate together only during the time that radio transmitter 146 transmits a signal to radio receiver 120. Such time is controlled by timer 140.

One of the advantages of the present invention is to provide a line monitoring apparatus which may be easily adjusted as to location, height and agle of use, providing thereby flexibility in the use thereof.

Another advantage of the present invention is to provide an apparatus which is inexpensive to fabricate and reliable in use.

Still another advantage of the present invention is to provide a boundary interruption detection apparatus which is portable in nature and may be moved from place to place with a relative ease.

Yet another advantage of the present invention is to provide a portable apparatus which is useful operating from household utility voltage as well as from a rechargeable battery power supply.

A further advantage of the present invention is to provide an apparatus which can be used such that the beam transmitting device is signaled by the beam receiving device so that the transmitting portion of the present invention provides an alarm simultaneously with the alarm signaling that the boundary line has been interrupted.

Another advantage of the present invention is to provide a boundary line monitoring system which may be utilized with a duplicate system both providing a radio signal emanating outwardly therefrom such that a timing apparatus can be remotely located from the installation site of both systems, thereby measuring the elapsed time between crossing two displaced boundary lines.

Still another advantage of the present invention is to provide an apparatus which can be economically utilized, though rugged in use, for sporting events wherein adjustment of height is critical.

Yet another advantage of the present invention is to provide an apparatus whose visual and audible alarm systems are energized for a predetermined period of time when the monitored boundary line is crossed instantaneously.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A proximity detector comprising a light transmitting apparatus and a light receiving apparatus, said light transmitting apparatus including a housing assembly, said housing assembly including a housing and a tripod and indicia, said tripod providing support for said housing, the lowermost regions of said tripod having lockable wheels rotatably secured thereto disposed upon a supporting surface, said housing being elevated relative to the uppermost regions of said tripod, said tripod being adjustable in height, means to rotatably secure said housing with respect to said tripod about a first axis including means to releasably lock said housing against rotation about said first axis, means to rotatably secure said housing with respect to a second axis including means to releasably lock said housing against rotation about said second axis, said second axis disposed orthogonal to said first axis, said indicia indicating the elevation of said housing relative to said uppermost regions, said light transmission apparatus including a light source and a radio receiver and a first power supply and an alarm group of devices, said alarm group including a visual alarm and an audible alarm, said first power supply coupled to said light source and said radio receiver and said alarm group, said radio receiver energizing said alarm group from said first power supply only when said radio receiver is activated by radio signals, said light receiving apparatus having another said housing assembly and a photosensitive device and a timer and another said alarm group and a radio transmitter and a second power supply, means for said radio signals being transmitted by said radio transmitter to be received by said radio receiver, said second power supply coupled to and providing energizing power said photosensitive device and said timer and said another alarm group and said radio transmitter, said timer controlling the time of energization of said another said alarm group and the time that said radio transmitter transmits said radio signals to said radio receiver, said another said alarm group and said radio transmitter and said timer being energized by said second power supply only when said photosensitive device ceases to receive light emanated by said light source.

2. The apparatus as claimed in claim 1 further comprising at least one optical filter element, and means to removable secure said at least one filter element to said housing assembly at a location intermediate said light source and said photosensitive device.

3. The apparatus as claimed in claim 1 therein at least one of said first power supply and said second power supply comprises a rechargeable battery.

4. The apparatus as claimed in claim 3 further comprising a rectifier, said rectifier being coupled to said rechargeable battery.

5. The apparatus as claimed in claim 1 further comprising at least one bubble-like level, said at least one level fixedly secured to at least one of said housing assembly and said another said housing assembly.

6. The apparatus as claimed in claim 1 wherein at least one of said first power supply and said second power supply is disposed located outside said housing assembly.

7. The apparatus as claimed in claim 1 further comprising a lens, said lens being disposed located adjacent said light source, another lens, said another lens being disposed located adjacent said photosensitive device.

8. The apparatus as claimed in claim 1 further comprising a rod, said rod fixedly secured at one end thereof to said housing assembly, the other end of said rod having a rubber-like grip fixedly secured thereto.

9. The apparatus as claimed in claim 1 wherein said tripod comprises three legs, each of said three legs having a pair of tubes, one tube of said pair of tubes lockingly telescopingly engaged within the other tube of said pair of tubes.

* * * * *